(12) United States Patent
Xu et al.

(10) Patent No.: US 11,128,231 B2
(45) Date of Patent: Sep. 21, 2021

(54) SYSTEM AND METHOD FOR EXCITING LOW-IMPEDANCE MACHINES USING A CURRENT SOURCE CONVERTER

(71) Applicant: General Electric Company, Schenectady, NY (US)

(72) Inventors: Yuntao Xu, Clifton Park, NY (US); David Allan Torrey, Ballston Spa, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/529,118

(22) Filed: Aug. 1, 2019

(65) Prior Publication Data
US 2021/0036627 A1   Feb. 4, 2021

(51) Int. Cl.
*H02M 5/458*  (2006.01)
*F03D 9/25*   (2016.01)
(Continued)

(52) U.S. Cl.
CPC ............ *H02M 5/4585* (2013.01); *F03D 9/25* (2016.05); *H02H 7/1222* (2013.01);
(Continued)

(58) Field of Classification Search
CPC .... H02M 5/4585; H02M 1/14; H02M 5/4505; F03D 9/25; H02H 7/1222; H02K 7/183; H02K 55/00
See application file for complete search history.

(56) References Cited

U.S. PATENT DOCUMENTS

| 3,831,077 A | * | 8/1974 | Richeson, Jr. ....... H02H 7/1216 363/37 |
| 3,947,748 A | * | 3/1976 | Klein ................... H02H 7/1225 363/57 |

(Continued)

FOREIGN PATENT DOCUMENTS

| CN | 101170284 A | 4/2008 |
| CN | 201696223 U | 1/2011 |

(Continued)

OTHER PUBLICATIONS

CN 201696223 English translation (Year: 2011).*

(Continued)

*Primary Examiner* — Viet P Nguyen
(74) *Attorney, Agent, or Firm* — Dority & Manning, P.A.

(57) ABSTRACT

An energy conversion system includes a low-impedance generator having at least one armature winding set. The armature winding set includes a plurality of single-phase coils. The system also includes a current source converter assembly electrically coupled to an armature of the generator. The current source converter assembly includes at least one current source converter that includes a current source rectifier coupled to a current source inverter via a DC link and at least one capacitor across the plurality of single-phase armature coils. The capacitor(s) of the current source converter(s) is configured to absorb high frequency components of current pulses generated by the current source converter so as to minimize current ripple in a current applied to the plurality of single-phase coils.

17 Claims, 11 Drawing Sheets

(51) Int. Cl.
  H02H 7/122 (2006.01)
  H02K 7/18 (2006.01)
  H02K 55/00 (2006.01)
  H02M 1/14 (2006.01)
  H02M 5/45 (2006.01)
(52) U.S. Cl.
  CPC ............ *H02K 7/183* (2013.01); *H02K 55/00* (2013.01); *H02M 1/14* (2013.01); *H02M 5/4505* (2013.01)

(56) References Cited

U.S. PATENT DOCUMENTS

| | | | | |
|---|---|---|---|---|
| 5,091,069 | A * | 2/1992 | Hendrickson | C01B 13/115 204/176 |
| 5,172,310 | A | 12/1992 | Deam et al. | |
| 5,500,561 | A | 3/1996 | Wilhelm | |
| 5,642,270 | A | 6/1997 | Green et al. | |
| 5,902,506 | A * | 5/1999 | Scott | H05B 6/08 219/608 |
| 6,362,588 | B1 | 3/2002 | Umans et al. | |
| 7,599,196 | B2 * | 10/2009 | Alexander | H02M 3/1582 363/13 |
| 8,582,255 | B2 | 11/2013 | Xin et al. | |
| 9,252,645 | B2 | 2/2016 | Crane | |
| 2005/0012339 | A1 * | 1/2005 | Mikhail | H02P 9/105 290/44 |
| 2009/0224550 | A1 * | 9/2009 | Bray | H02K 55/04 290/55 |
| 2011/0287942 | A1 | 11/2011 | Imparato et al. | |
| 2011/0292697 | A1 * | 12/2011 | Alexander | H02M 7/4807 363/37 |
| 2012/0081058 | A1 * | 4/2012 | Bortolus | H02P 27/08 318/490 |
| 2012/0221159 | A1 * | 8/2012 | Olesen | F03D 9/257 700/292 |
| 2013/0200691 | A1 * | 8/2013 | Crane | B63H 23/24 307/9.1 |
| 2014/0035289 | A1 * | 2/2014 | Eichler | F03D 9/257 290/55 |
| 2016/0268797 | A1 * | 9/2016 | Li | H02M 1/32 |
| 2017/0264187 | A1 | 9/2017 | Lukasik et al. | |

FOREIGN PATENT DOCUMENTS

| | | |
|---|---|---|
| CN | 1874111 B | 2/2011 |
| CN | 202513589 U | 10/2012 |
| CN | 103050975 A | 4/2013 |
| EP | 2448100 A2 | 5/2012 |
| EP | 2808995 A2 | 12/2014 |
| EP | 3063860 A1 | 9/2016 |
| WO | WO2012/104580 A2 | 8/2012 |

OTHER PUBLICATIONS

Wang et al., A Current Source Converter Fed High Power Wind Energy Conversion System with Superconducting Magnetic Storage System in DC Link, IEEE Explore, 2010 International Conference on Electrical Machines and Systems, Incheon, South Korea, Oct. 10-13, 2010. (Abstract Only).

Rodriguez et al., Analysis and Performance Comparison of Different Power Conditioning Systems for SMES-Based Energy Systems in Wind Turbines, IEEE Explore, 2012 $3^{rd}$ IEEE International Symposium on Power Electronics for Distributed Generation Systems (PEDG), Aalborg, Denmark, Jun. 25-28, 2012. (Abstract Only).

Espinoza, Wind Turbine Characterization by Voltage Source Converter Based Test Equipment, Chalmers University of Technology, Thesis, Gothenburg, Sweden, 2016, 176 Pages—See p. 5.

Asplund et al., DC Transmission Based on Voltage Source Converters, ABB Power Systems AB, CIGRE SC14 Colloquium in South Africa 1997, 8 Pages.

European Search Report for EP application No. 20189008.4, dated Jan. 12, 2021.

* cited by examiner

SYSTEM AND METHOD FOR EXCITING LOW-IMPEDANCE MACHINES USING A CURRENT SOURCE CONVERTER

FIELD

The present disclosure relates generally to low-impedance machines, such as superconducting machines, and more particularly to systems and methods for exciting low-impedance machines using a current source converter.

BACKGROUND

Generally, superconducting machines, such as superconducting generators, include at least one superconducting coil which generates a static or rotating magnetic field and at least one armature coil which also generates a static or rotating magnetic field that interacts with the field from the superconducting coil. Further, superconducting generators are made by constructing the generator field coils (which typically carry a direct current) of a superconducting material ("superconductor") instead of the usual copper material. Superconductors are typically lighter in weight and smaller in size (e.g., relative to current carrying capacity) than traditional conductors such as copper, and are also more efficient at conducting current (particularly at lower frequencies). Thus, the use of superconductors in power applications, such as wind turbine generators, provides benefits such as more efficient performance, lower generator weight, non-gearbox direct drive operation, and lower manufacturing and installation costs. Such benefits are particularly useful for offshore wind turbine applications.

Superconducting (SC) wires support very high current densities without any dissipation, which facilitates field windings that create very high magnetic fields. SC wires typically only remain in a SC state if their exposure to AC fields is kept to a minimum. This makes the SC wires appropriate only for field windings that are fed DC currents. The armature windings are made with conventional conductor, typically copper but could be aluminum or some other material with good conductivity. The SC wires can operate at magnetic fields on the order of 7 T. Because torque density is tied to field strength, electric machines with SC field coils offer substantially greater torque density than conventional ones. In applications where minimizing generator size and weight is important, the use of SC field windings can be extremely valuable. Off-shore wind turbines are such an application since the mass on top of the tower has significant influence on the tower and foundation cost.

The high magnetic fields produced by the SC field windings are more than sufficient to saturate the magnetic materials typically used in electric machines for ducting magnetic flux to the air gap where torque is produced. Accordingly, the armature winding for a superconducting machine does not benefit from using magnetic materials. As a result, the armature winding has very low impedance, typically an order of magnitude smaller than the armature winding for a conventional machine. Some permanent magnet machines also use magnetic topologies that result in very low impedance.

The electronic excitation of most electric machines is accomplished using an electronic converter that is known as a voltage source converter, as shown in FIG. 1. More specifically, FIG. 1 illustrates a schematic diagram of one embodiment of the structure of a voltage source converter 1 and its interface to a three-phase electric machine (not shown). As shown, the three leads 3 on the left go to the electric machine (not shown). Further, as shown, the inductors 4 may be the phase inductance of the electric machine or may be separate filter inductors. The two leads 5 on the right connect to a DC power source (not shown). Depending on the operating mode of the system, it may be necessary for the voltage source converter 1 to accept power.

As such, the voltage source converter 1 includes a voltage source that is connected to the electric machine through a switch matrix 6. Sequential operation of the switches 6 results in the flow of AC currents within the electric machine armature winding. The flow of current is used to create electromagnetic torque. Within the voltage source converter 1, an objective is to regulate the currents in the phase windings to control the electromagnetic torque. In a conventional electric machine, the impedance of the electric machine is sufficiently large that the electric machine behaves like a low pass filter, thereby resulting in smooth phase currents despite the switched voltages being applied to the phase windings.

However, in an electric machine with low impedance, such as a machine with a superconducting field winding, the low impedance implies that phase currents will have very high ripple unless some form of low-pass filter is inserted between the voltage source converter and the machine. However, the low-pass filter introduces loss and control challenges to the efficient operation of the electric machine. In addition, very high fault currents can result because there is so little impedance to limit current. In addition, regulation of the phase currents under normal operating conditions when using a voltage source converter is difficult, again because there is so little impedance that large current ripple results.

Thus, the industry is in need of an improved system and method for exciting low-impedance machines. Accordingly, the present disclosure is directed to a system and method that utilizes a current source converter, rather than a voltage source converter, to resolve many of the control and operational issues associated with controlling the phase currents in a low impedance electric machine.

BRIEF DESCRIPTION

Aspects and advantages of the invention will be set forth in part in the following description, or may be obvious from the description, or may be learned through practice of the invention.

In one aspect, the present disclosure is directed to a wind turbine. The wind turbine includes a tower, a nacelle mounted atop the tower, a rotor coupled to the nacelle and having a rotatable hub with at least one rotor blade secured thereto, and a superconducting generator coupled to the rotor. The generator includes at least one armature winding set having a plurality of single-phase coils. The wind turbine also includes a current source converter assembly electrically coupled to an armature of the generator. The current source converter assembly includes at least one current source converter having a current source rectifier coupled to a current source inverter via a DC link and at least one capacitor across the plurality of single-phase armature coils. The capacitor(s) of the current source converter assembly is configured to absorb high frequency components of current pulses generated by the current source converter so as to minimize current ripple in a current applied to the plurality of single-phase coils.

In an embodiment, the low-impedance generator is a superconducting generator. In another embodiment, the current source converter assembly may include a plurality of capacitors with at least one of the plurality of capacitors across each of the plurality of single-phase coils.

In further embodiments, the DC link may include at least DC link inductor. In such embodiments, current within the DC link may be controlled by voltage across the DC link inductor(s). In another embodiment, the DC link inductor may be a stiff current source (e.g. having an internal impedance of 100 times more than a load impedance).

In additional embodiments, the current source rectifier and the current source inverter may each include a plurality of switches. In another embodiment, the current source converter assembly may include a crowbar circuit.

In still further embodiments, the wind turbine may include a controller for controlling operation of the low-impedance generator and the current source converter assembly. As such, in certain embodiments, upon a short-circuit event in the current source converter assembly, the controller is configured to turn on the crowbar circuit to provide a path for current from the DC link and to turn off the plurality of switches in the current source converter assembly, thereby blocking the current between the generator and the DC link.

In several embodiments, the current source converter assembly may include a plurality of current source converters electrically coupled to the low-impedance generator and to a power grid. In another embodiment, the plurality of current source converters may be connected in parallel. In addition, each of the plurality of current source converters may be configured to process a portion of a total power of the wind turbine.

In yet another embodiment, the wind turbine may include an active power balancing mechanism configured to ensure that the total power is evenly shared among the current source converters.

In particular embodiments, the wind turbine may be an offshore wind turbine. Alternatively, the wind turbine may be an onshore wind turbine.

In another aspect, the present disclosure is directed to a method of operating a wind turbine. The wind turbine has a low-impedance generator with a plurality of single-phase armature coils and a current source converter assembly electrically coupled to the generator armature. The current source converter assembly has at least one current source converter. The method includes monitoring the wind turbine for faults. In response to detecting a short-circuit fault in the current source converter assembly, the method includes turning on, via a controller, a crowbar circuit of the current source converter assembly to provide a current path for current from a DC link inductor of a DC link of the current source converter assembly and turning off, via the controller, a plurality of switches in the current source converter assembly so as to block the current path between the generator and the DC link inductor.

In yet another aspect, the present disclosure is directed to an energy conversion system. The energy conversion system includes a low-impedance electric machine and a current source converter assembly electrically coupled to the electric machine. The current source converter assembly includes at least one current source converter having a current source rectifier coupled to a current source inverter via a DC link and at least one capacitor. The capacitor(s) of the current source converter assembly is configured to absorb high frequency components of current pulses generated by the current source converter so as to minimize current ripple in a current applied to the electric machine.

In an embodiment, the low-impedance electric machine may include a generator or a motor. It should be further understood that the energy conversion system may further include any of the additional features and/or steps described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
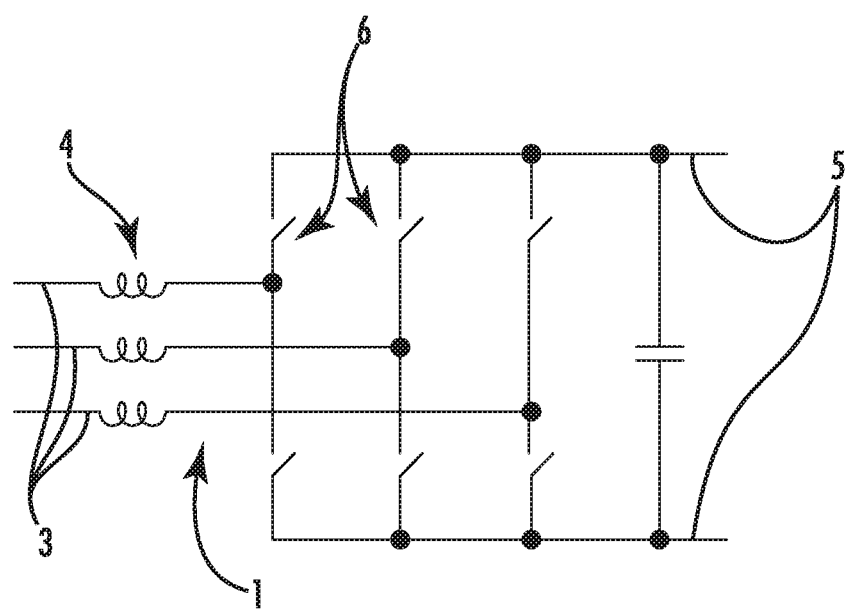
FIG. 1 illustrates a schematic diagram of a voltage source converter according to conventional construction.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure is directed to an energy conversion system, such as a wind turbine, that includes a low-impedance electric machine, such as a superconducting generator. For sake of explanation, the present system is described herein with reference to a superconducting generator in general, and more particularly to a wind turbine superconducting generator, but is not limited to superconducting generators. More specifically, the present disclosure provides solutions to various challenges that a power electronic converter encounters while interfacing with a low-impedance electric machine in general, and a superconducting generator in particular. One challenge is to provide high fidelity current to the machine and maintain the ripple content low enough so that the machine operation is not adversely affected. Another challenge is to block the current path in case there is short circuit occurring internal to the converter. Utilizing one or more current source converters as described herein according to the present disclosure solves, at least, the aforementioned challenges.

Figure 2:
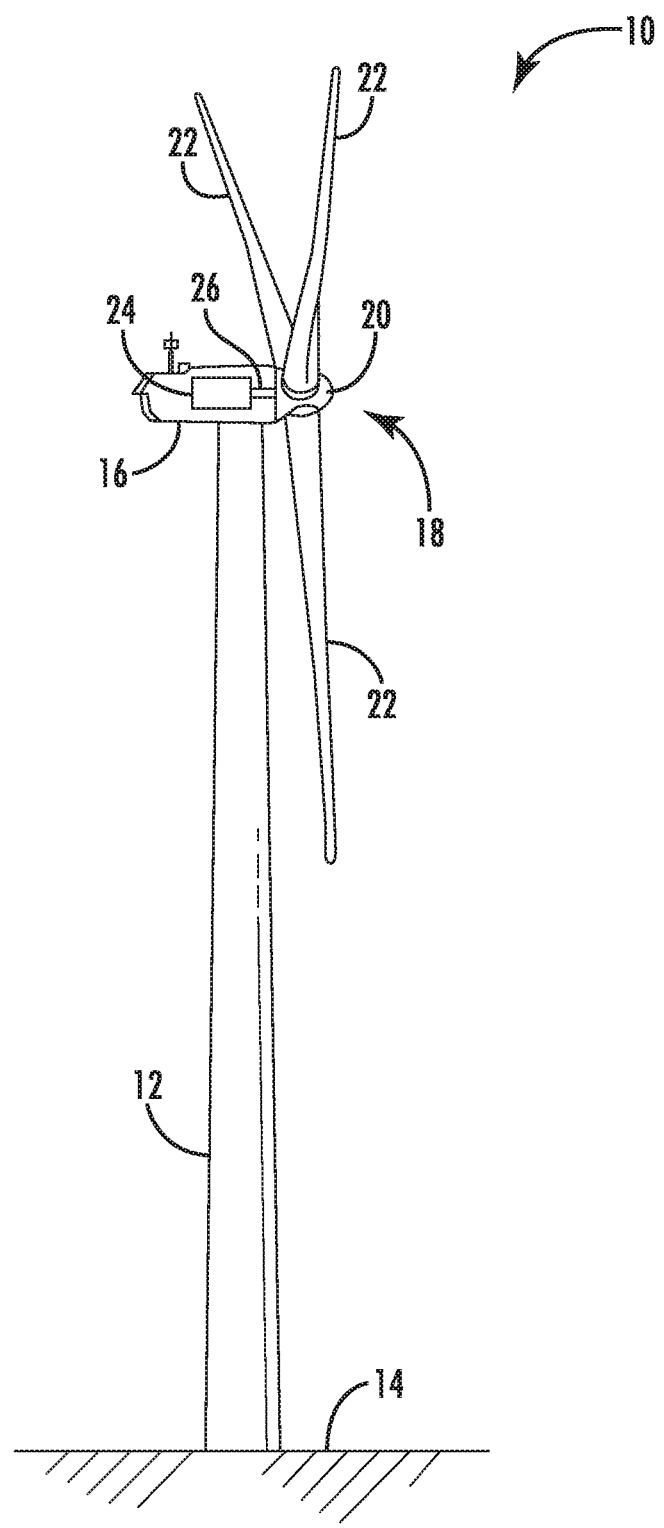
FIG. 2 illustrates a perspective view of an embodiment of a wind turbine with a superconducting generator according to the present disclosure.

Referring now to the drawings, FIG. 2 illustrates a perspective view of one embodiment of a wind turbine power generating system 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 (three are shown) coupled to and extending outwardly from the hub 20. Each rotor blade 22 may be spaced about the hub 20 to facilitate rotating the rotor 18 to enable kinetic energy to be transferred from the wind into usable mechanical energy, and subsequently, electrical energy. For this purpose, the rotor 18 is coupled to a generator 24 via a shaft 26. For purposes of the present disclosure, the generator 24 is a direct drive superconducting generator.

The present invention encompasses a wind turbine power generating system 10, as described above, wherein the generator 24 is configured as a three-phase superconducting generator as set forth below. The present invention also encompasses various methodologies of operating a superconducting generator, in particular a wind turbine superconducting generator in accordance with method aspects set forth below.

Figure 3:
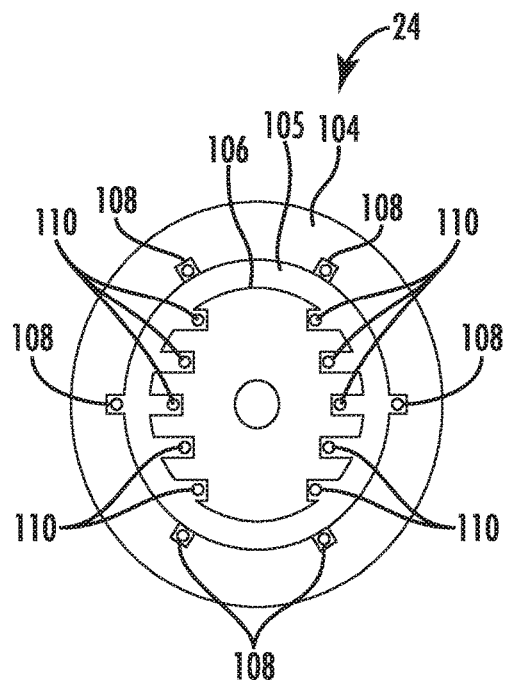
FIG. 3 illustrates a cross-sectional view of one embodiment of a superconducting generator according to the present disclosure.

Referring now to FIG. 3, a cross-sectional view of one embodiment of the superconducting generator 24 from FIG. 1 is illustrated. Although the superconducting generator 24 is illustrated and described herein, it should be understood that the features described herein may apply to any superconducting machine and is not limited to wind turbine power systems.

As depicted, the generator 24 includes an outer concentric component 104, which may be the stator, and an inner concentric component 106, which may be the rotor (e.g., in an internal rotor configuration). However, in other embodiments, the outer component 104 may be a rotor of the generator 24, and the inner component 106 may be a stator of the generator 24 (e.g., in an external rotor configuration).

Further, as shown, a gap (or "air gap") 105 may be defined between the outer component 104 and the inner component 106 so as to allow movement (e.g., rotation) therebetween.

In addition, as shown, the generator 24 may also include at least one winding set. For example, as shown, the winding set(s) may include a first set of one or more current carrying conductors ("coils") 108 attached to the outer component 104 and a second set of one or more current carrying conductors ("coils") 110 attached to the inner component 106. The field conductors have superconducting properties at sufficiently low temperature, magnetic field, and current density. Accordingly, the field conductors are operated within one or more low temperature zones. During operation of the generator 24, these coils 108, 110 are in electromagnetic communication. More specifically, in an embodiment, the coils 108 may be armature coils and the coils 110 may be field coils of the generator 24. In other embodiments, the coils 108 may be field coils and the coils 110 may be armature coils of the generator 24.

The field coils carry excitation current, wherein current flowing therethrough produces a magnetic field through the field coil, and the armature coil is connected to the output of the generator 24 (e.g., via output terminals) to conduct an output current and electrical power output. Although several coils 108, 110 are depicted, there may be more or fewer coils 108, 110 and/or windings thereof about the outer component 106 and inner component 108 in various embodiments, e.g., to configure the number of poles of the generator 24 and, thereby, the generating frequency and/or other operating characteristics of the generator 24.

The magnetic field generated by the armature coil is due to the magneto-motive force (MMF) setup by the current which flows through the armature winding. The MMF has both spatial and temporal harmonics associated with it due to the discretization of the coils, magnetic saturation within the steel structures, and the pulse-width modulation scheme employed by a switching inverter to drive the current waveform to a desired shape.

The field coils, e.g., coils 110, may be constructed of a low-temperature superconducting material, such as niobium-titanium (NbTi), niobium-tin (Nb3Sn), or magnesium-diboride (MgB2), or a high-temperature superconducting material, such as YBCO or ReBCO. Typically, the armature coils 108 are constructed from copper. However, in certain embodiments, the armature coils 108 may also be constructed of a superconducting material, such as NbTi, Nb3Sn, or MgB2. In certain embodiments, the superconducting material may also be a high temperature superconductor, such as YBCO or ReBCO.

Figure 4:
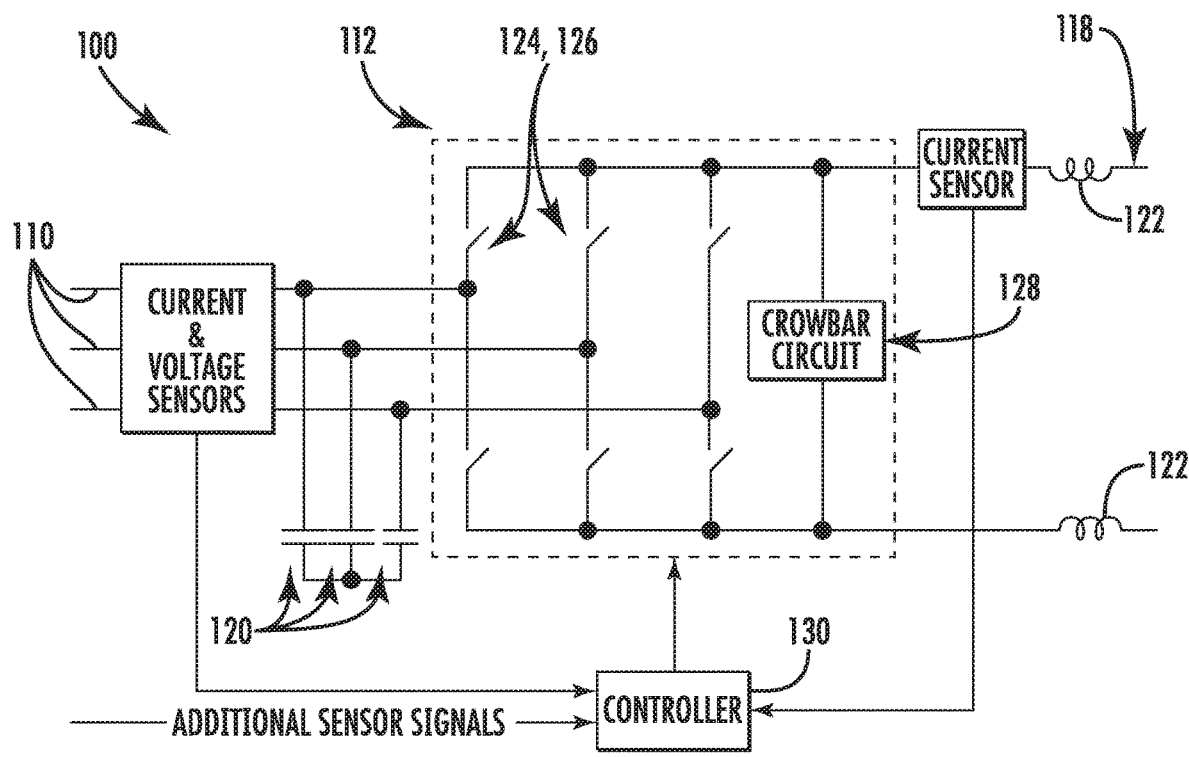
FIG. 4 illustrates a partial, schematic diagram of one embodiment of a current source converter according to the present disclosure.
Figure 5:
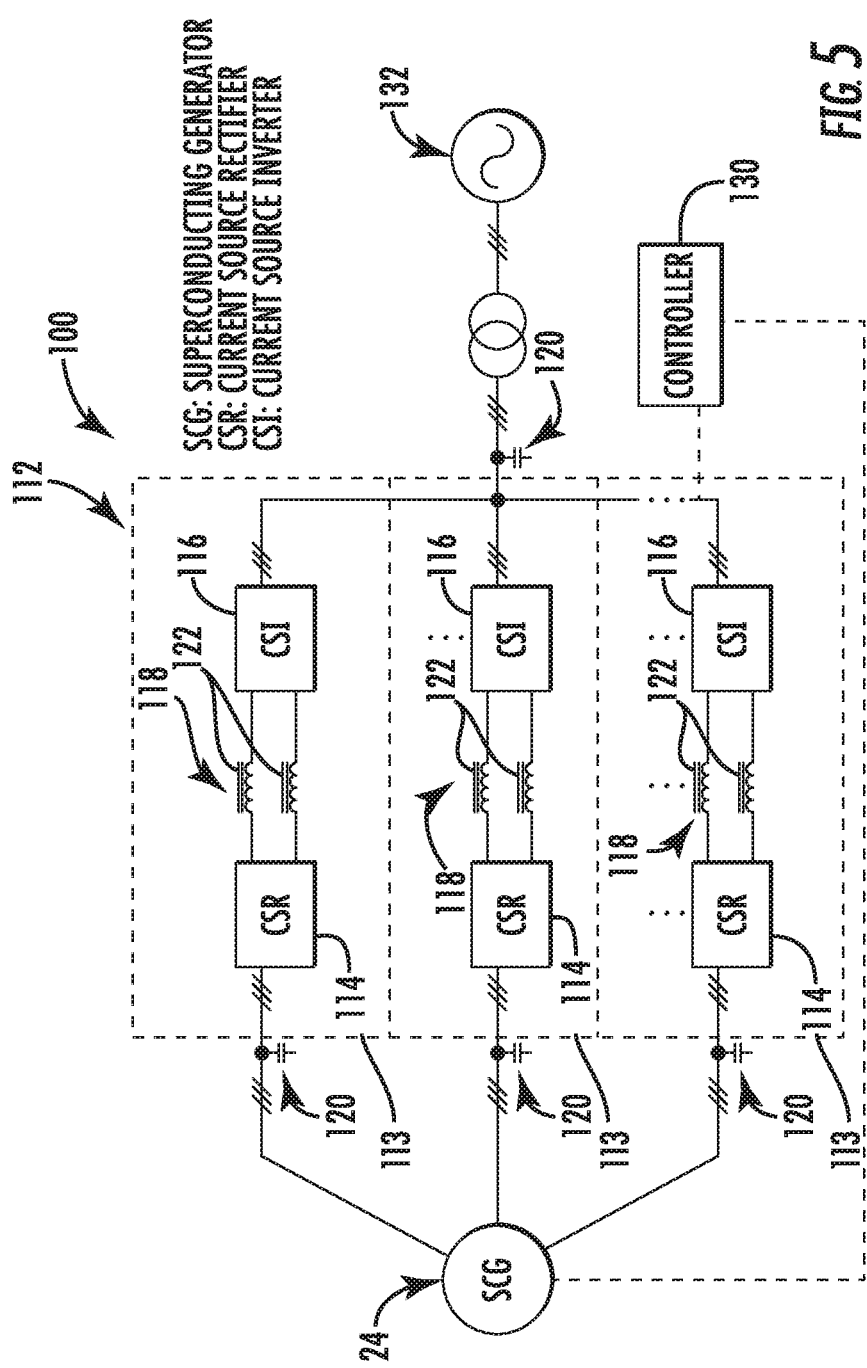
FIG. 5 illustrates a schematic diagram of one embodiment of an energy conversion system according to the present disclosure, particularly illustrating a system having a plurality of current source converters electrically coupled between a superconducting generator and the power grid.
Figure 7:
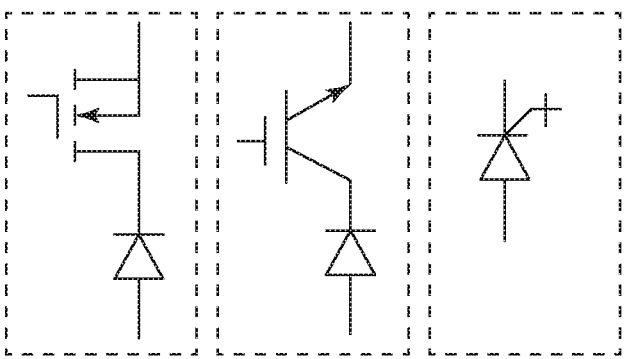
FIG. 7 illustrates a schematic diagram of one embodiment of a switch arrangement for a current source rectifier of a current source converter according to the present disclosure.
Figure 8:
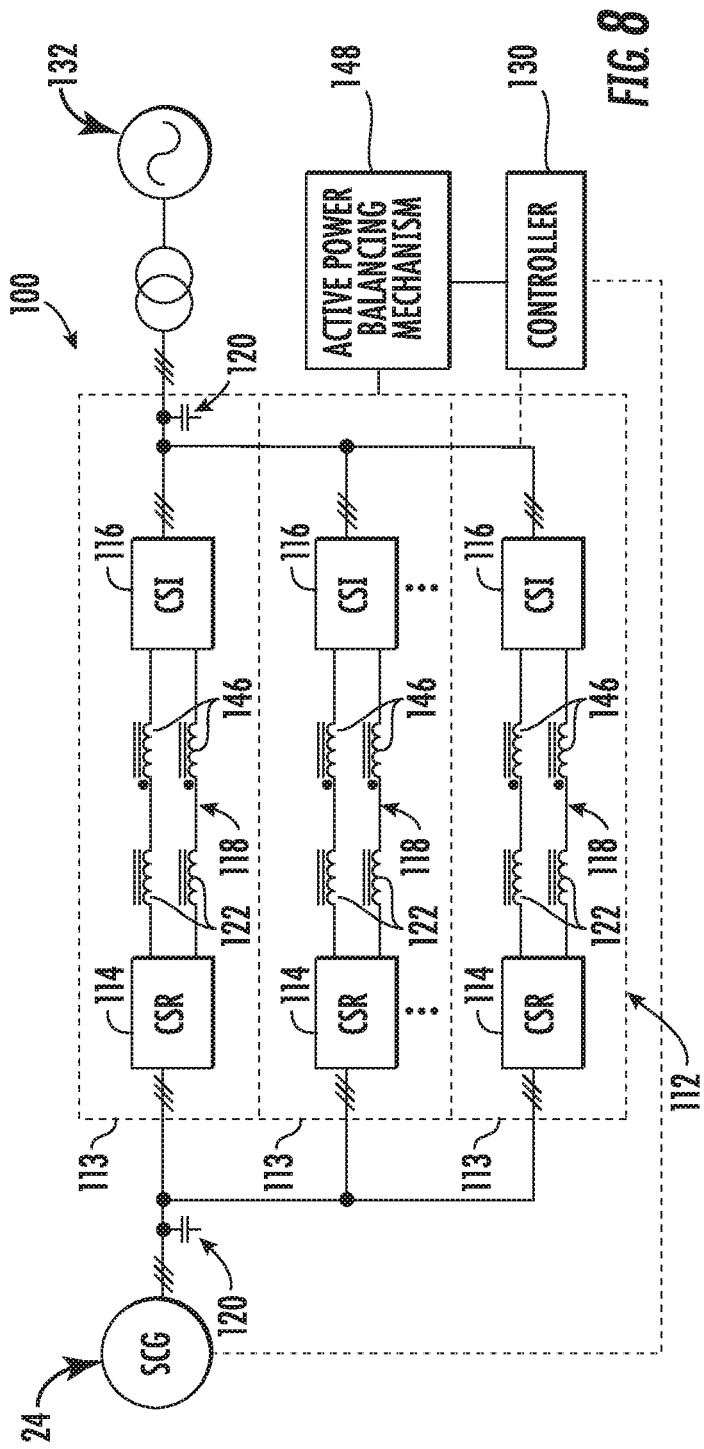
FIG. 8 illustrates a schematic diagram of another embodiment of an energy conversion system according to the present disclosure, particularly illustrating system having a plurality of current source converters electrically coupled between a superconducting generator and the power grid.

Referring now to FIGS. 4, 5, and 8, various views of multiple embodiments of an energy conversion system 100 having a current source converter assembly 112 according to the present disclosure are illustrated. More specifically, as shown, the system 100 may also include at least one current source converter assembly 112 electrically coupled to the low-impedance/superconducting generator 24 armature and a controller 130 for controlling operation of the generator 24 and the current source converter assembly 112 (as well as any other components of the system 100). Further, as shown particularly in FIGS. 5 and 8, the current source converter assembly 112 may include plurality of modular current source converters 113 each having a current source rectifier 114 coupled to a current source inverter 116 via a DC link 118. More particularly, as shown in FIGS. 4, 6, and 7, the current source rectifier 114 and the current source inverter 116 may each include a plurality of switches 124, 126.

Figure 6:
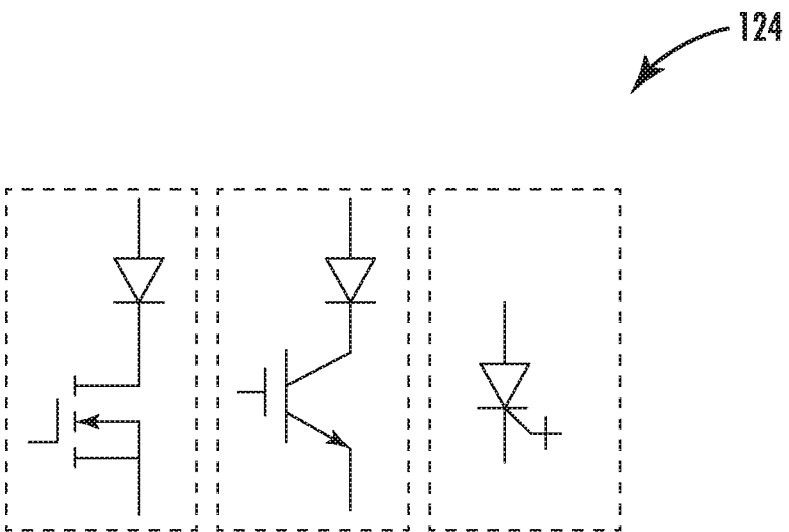
FIG. 6 illustrates a schematic diagram of one embodiment of a switching arrangement for a current source inverter of a current source converter according to the present disclosure.

For example, FIG. 6 illustrates example switches 124 that may be employed by the current source inverter 116. FIG. 7 illustrates example switches 126 that may be employed by the current source rectifier 114. Accordingly, as shown, one or more symmetrical integrated gate-commutated thyristors (IGCT) may be one implementation. In another embodiment, one or more asymmetric IGCTs may be used with a series connected diode for reverse blocking capability. In yet another embodiment, an insulated-gate bipolar transistor (IGBT) with diode connected in series may be used. In still another embodiment, one or more SiC MOSFETs with a diode connected in series may further be used, which can provide robust switching performance, higher switching frequency, and a compact converter design.

Therefore, it should be understood that any suitable combination of switches may be used in the current source converter(s) 113 described herein.

In addition, as shown in FIGS. 4, 5, and 8, the DC link 118 may include at least one DC link inductor 122. As such, in an embodiment, current within the DC link 118 may be controlled by voltage across the DC link inductor(s) 122. In other words, the current source converter 113 may operate with a stiff DC link current and may provide switched current to the output.

In addition, in the event of a short circuit internal to the current source converter assembly 112, the DC filter inductor 122 is configured to limit the rise of the fault current. More importantly, the converter AC terminals can be isolated from the internal DC bus easily, thus blocking the fault current path. This is an important advantage compared with the voltage source converter (FIG. 1), where the blocking of fault current is more challenging. For the superconducting generator 24, the high fault current has significant impact on the mechanical integrity of the machine, and a power electronic converter (such as the current source converter assembly 112 described herein) with reliable short circuit fault response is necessary.

In further embodiments, as shown in FIG. 5, the current source converter assembly 112 may also include at least one capacitor 120 across the plurality of single-phase armature coils 108. More specifically, as shown in FIGS. 4 and 8, the current source converter assembly 112 may include a plurality of capacitors 120 with at least one of the plurality of capacitors 120 across each of the plurality of single-phase armature coils 108. Thus, in an embodiment, the capacitor(s) 120 may be three-phase capacitors. Thus, in certain embodiments, the capacitors 120 of the current source converter assembly 112 are configured to absorb high frequency components of current pulses generated by the current source converter(s) 113 so as to minimize current ripple in a current applied to the plurality of single-phase armature coils 108.

In addition, in particular embodiments, the capacitors 120 at the converter AC output terminals are configured to absorb the high frequency current components, with the superconducting generator 24 and electric power grid 132 being supplied with currents having low harmonic distortion. As such, the high dv/dt waveform (typical of the voltage source converter) is avoided.

Accordingly, the current source converter assembly 112 described herein provides high fidelity waveforms by creating switched current instead of switched voltage waveforms. The capacitors 120 at the converter AC side used to assist commutation also filter out the high frequency current harmonics, resulting in current of low distortion flowing into the superconducting generator armature winding 108. Further, the capacitors 120 are configured to limit dv/dt applied to the machine terminals. The cable inductance adds to the machine inductance, therefore, long cable lengths between the converter 113 and superconducting generator 24 has minimal to no impact on their operation.

Referring particularly to FIGS. 5 and 8, in particular embodiments, the system 100 may include a plurality of current source converters 113 electrically coupled to the generator 24 and to the power grid 132. In such embodiments, as shown, the plurality of current source converters 113 may be connected in parallel. For high-power superconducting generator applications, the embodiment illustrated in FIG. 5 may be suitable for interfacing the superconducting generator 24 to the utility grid. Thus, in such embodiments, the parallel connection of the modular current source converters 113 may be a dual of the cascaded H-bridge voltage source converter of conventional systems. Compared with the cascaded H-bridges, however, the double-frequency power ripple characteristic of the H-bridge voltage source converter does not exist in the three-phase current source converters. Therefore, parallel connection of modular current source converters 113 allows easy hardware implementation and straightforward control.

More specifically, it may be advantageous for the high power superconducting generator 24 to have multiple armature winding sets. Such a winding arrangement can help to mitigate the impact and severity of short-circuit faults, and the probability of a short circuit on the whole generator is reduced. The multiple armature winding sets may be electrically isolated and can be conveniently interfaced to the modular current source converters 113.

The superconducting generator 24 may be characterized by very low per-unitized impedance. However, this is largely due to the direct-drive low-speed wind power application scenario. The machine inductance in a physical unit is typically sufficient for low ripple current content without excessive capacitance requirement of the AC filter capacitor 120. At the grid side, interleaved switching patterns can be applied to the current source inverters 116 so that multilevel current waveforms may be generated at the AC terminals. As a result, the transformer leakage inductance, typically around 0.1 pu, can be sufficient to satisfy the total harmonic distortion (THD) requirements even with a low switching frequency.

More specifically, in certain instances, the parallel connection of multiple three-phase current source converters 113 may be less demanding compared with the cascaded H-bridge for multiple reasons. For example, in one instance, the multiple current source converters 113 can be established from the same AC interface with no need for isolation. In addition, the double-frequency power ripple characteristic of the H-bridge voltage source converter does not exist in the three-phase current source converters 113. Therefore, parallel connection of modular current source converters 113 allows easy hardware implementation and straightforward control.

Thus, for high power applications in particular, such as wind power generation, it may be advantageous to adopt a modular approach where multiple current source converters 113 are deployed in a coordinated manner to achieve high power processing capability, redundancy and enhanced reliability, and operational advantages such as interleaved switching for ripple minimization and reduced filtering.

Accordingly, FIGS. 5 and 8 illustrate a high power current source converter composed of multiple modular current source converters 113. Therefore, in an embodiment, each modular current source converter 113 processes a portion of the total machine power, and can be implemented with available power semiconductor switches without need for parallel and/or series connection of an excessive number of devices. In such embodiments, an active power balancing mechanism 148 may also be applied to ensure that the power is evenly shared among the modular current source converters 113.

Referring particularly to FIG. 8, another embodiment of a multi-level current source converter based on modular current source converters connected in parallel is illustrated. Compared with the embodiment shown in FIG. 5, however, the embodiment of FIG. 8 uses a common mode transformer 146 within each DC link 118 to limit the circulating currents among the current source converters. In spite of the benefit of ripple cancellation with interleaved switching as well as simpler topology at the SCG side, the common mode transformers 146 can be sizable.

In another embodiment, as shown in FIG. 4, the system 100 may also include a crowbar circuit 128. Thus, in several embodiments, upon a short-circuit event in the current source converter 113, the controller 130 is configured to turn on the crowbar circuit 128 to provide a path for current from the DC link 118, while also turning off the plurality of switches 124, 126 in the current source converter 113, thereby blocking the current between the generator 24 and the DC link 118.

Figure 9:
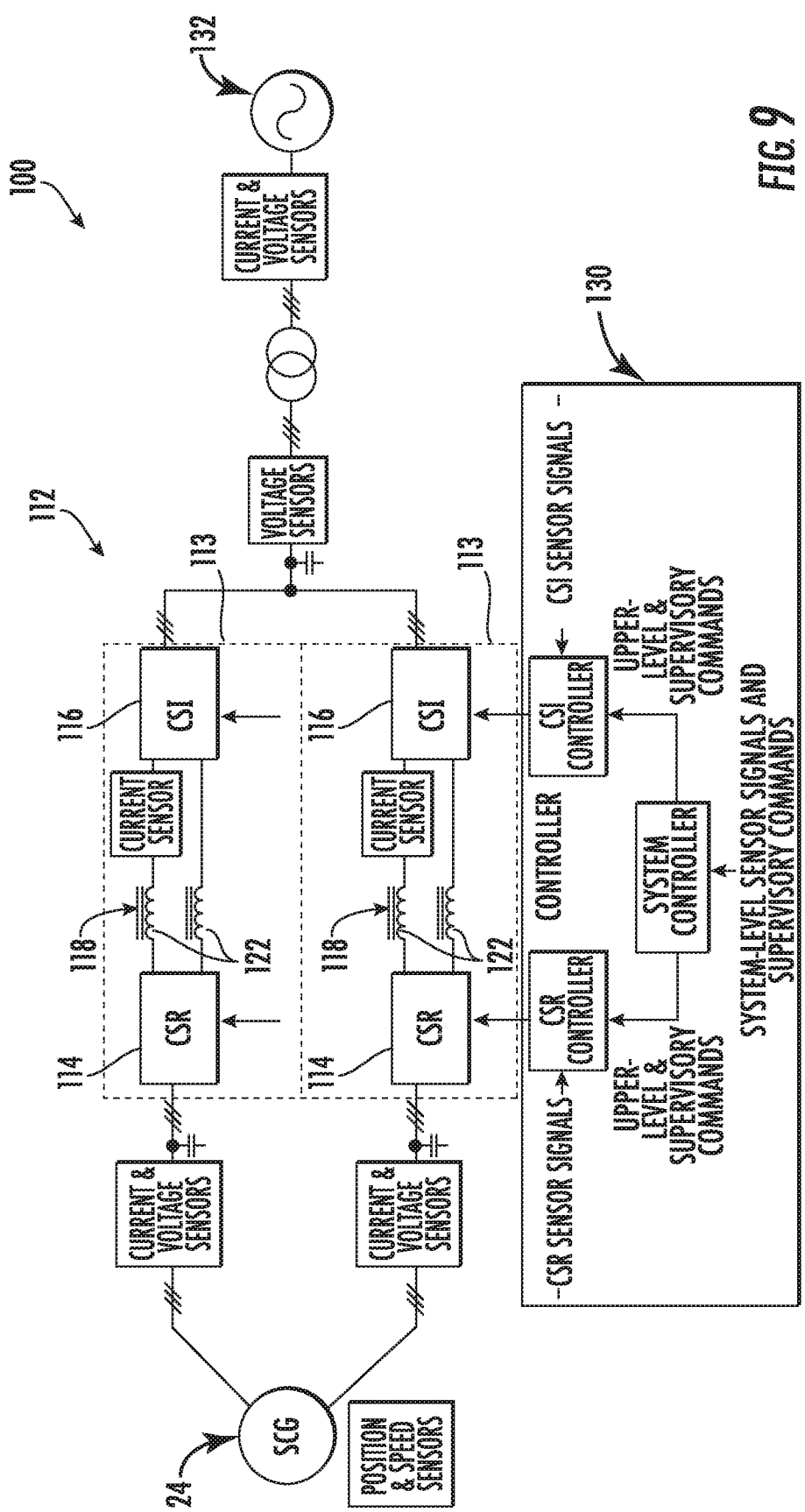
FIG. 9 illustrates a schematic diagram of yet another embodiment of a system according to the present disclosure, particularly illustrating a system configuration having a two-channel current source converter for a superconducting generator-based wind power generation system.

Referring now to FIG. 9, a schematic diagram of another embodiment of the system 100 according to the present disclosure is illustrated. In particular, a system configuration having a two-channel current source converter for a superconducting generator-based wind power generation system is provided. As shown, the controller processes the sensor signals and supervisory commands, and provides the switching commands to the current source rectifiers 114 and the current source inverters 116. The current source rectifiers 114 are controlled individually with the identical control structure, while the current source inverters 116 are controlled together (as a whole) augmented with active power sharing and balancing. Accordingly, interleaved switching pattern at the grid side can result in multilevel current pulses flowing into the current source inverter AC connection point, significantly reducing the ripple content and filter requirement. At the generator side, the flexibility of adjusting switching patterns of the multiple current source rectifiers 114 can be utilized for such objectives as harmonic field minimization.

Controller design knowledge for voltage source converters can be applied to the current source converters described herein by recognizing the duality between voltage source converters and current source converters. For example, in a typical AC uninterruptible power supply (UPS) designed with a three-phase voltage source converter, the AC voltage is regulated using a nested controller structure, where the outer loop acts on the AC voltage error and produces the AC inductor current reference, and the inner loop acts on the AC inductor current error to generate the modulation command.

For the present disclosure, including the current source converter, a similar nested controller can be constructed. For example, the outer loop can act on the line current error to produce the AC capacitor voltage command, and the inner loop can produce the modulation command to regulate the AC capacitor voltage. The controller usually is designed in the synchronous frame, and feedforward is used to improve the controller performance. Due to low switching frequency typical of high power applications, the sampling and calculation delay can adversely affect the controller behavior and complicate the controller design. The limited control bandwidth often necessitates additional control features such as active damping to achieve satisfactory results. The sampling and calculation delay should be accounted for as well in tuning the active damping parameters.

Figure 10:
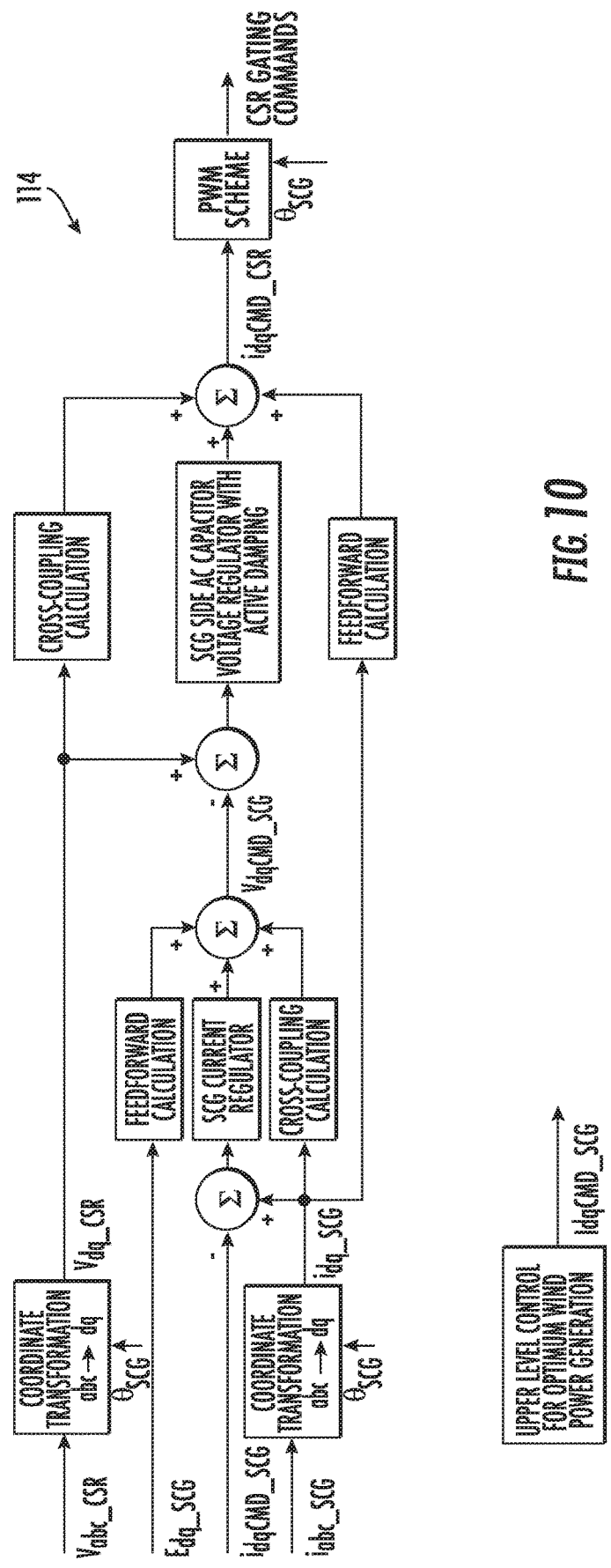
FIG. 10 illustrates a schematic diagram of one embodiment of control for a current source rectifier of a current source converter according to the present disclosure.
Figure 11:
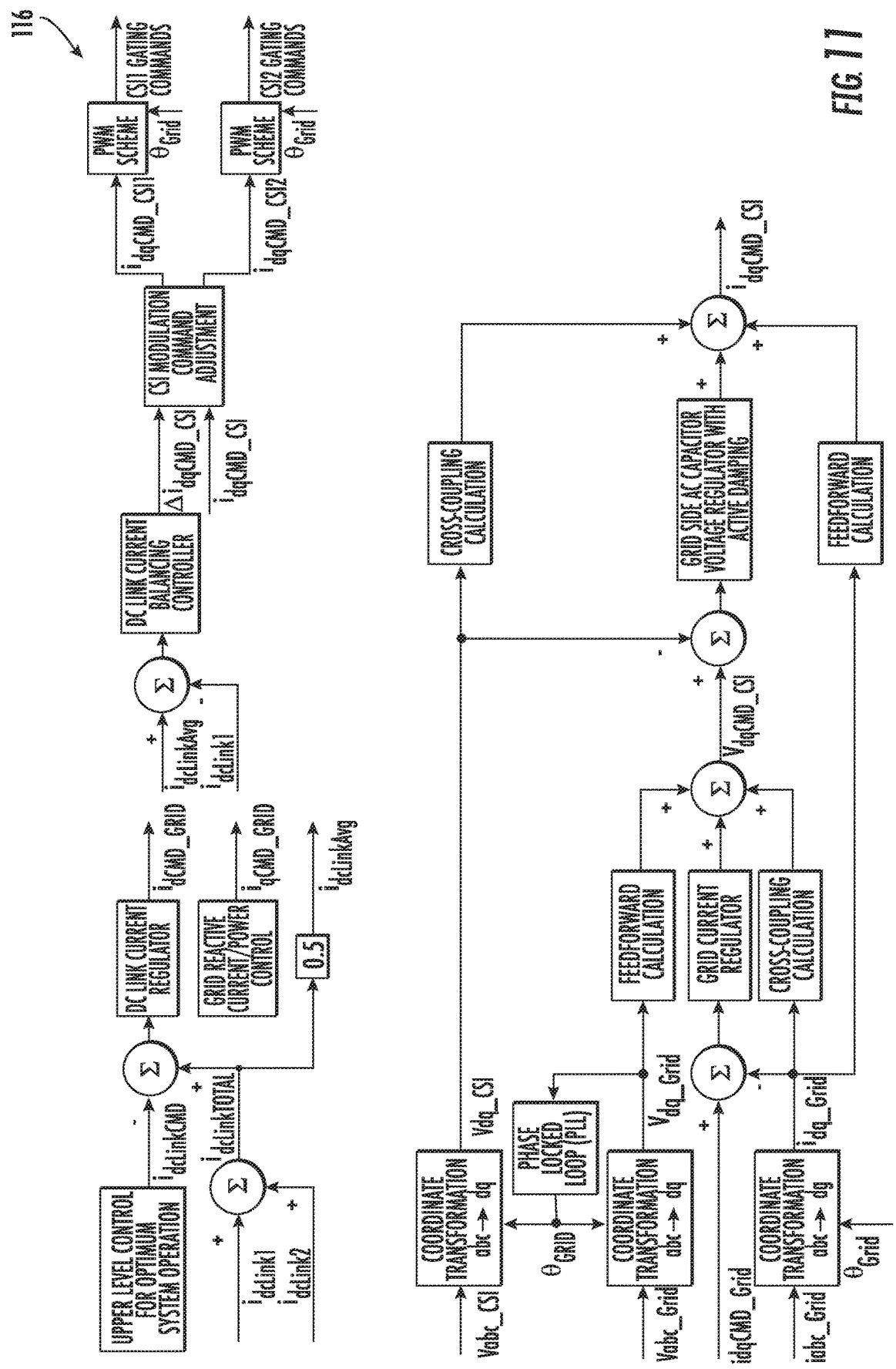
FIG. 11 illustrates a schematic diagram of one embodiment of control of a current source inverter of a current source converter according to the present disclosure.

Referring now to FIGS. 10 and 11, schematic diagrams of embodiments of controllers for the current source rectifier 114 and the current source inverter 116 described herein, respectively, are illustrated. As shown in FIG. 10, the current source rectifier 114 may be responsible for regulating the superconducting generator 24 armature phase currents. In addition, as shown, the superconducting generator 24 armature current command provided by the controller 130 may be used together with the superconducting generator 24 side AC armature current and voltage feedbacks to produce the switching commands to the current source rectifier 114.

As shown in FIG. 11, the controller for the current source inverter 116 may be responsible for maintaining the DC link currents. More specifically, as shown, the total DC link current command provided by the controller 130 together with the DC link current feedbacks may be used to produce the grid current active component command $i_{d\_CMDGrid}$, while the reactive current command $i_{q\_CMDGrid}$ typically is determined to accommodate various operating scenarios (such as reactive power dispatch and low voltage ride-through). The grid current command $i_{dq\_CMDGrid}$ can then be used together with the grid side AC current and voltage feedbacks to produce the modulation command $i_{dqCMD\_CSI}$ for the current source inverter 116. The modulation command $i_{dqCMD\_CSI}$ may be further adjusted by an active DC current balancing controller to result in the actual modulation commands for each current source inverter 116. The modulation commands can then be used to produce the switching commands.

Figure 12:
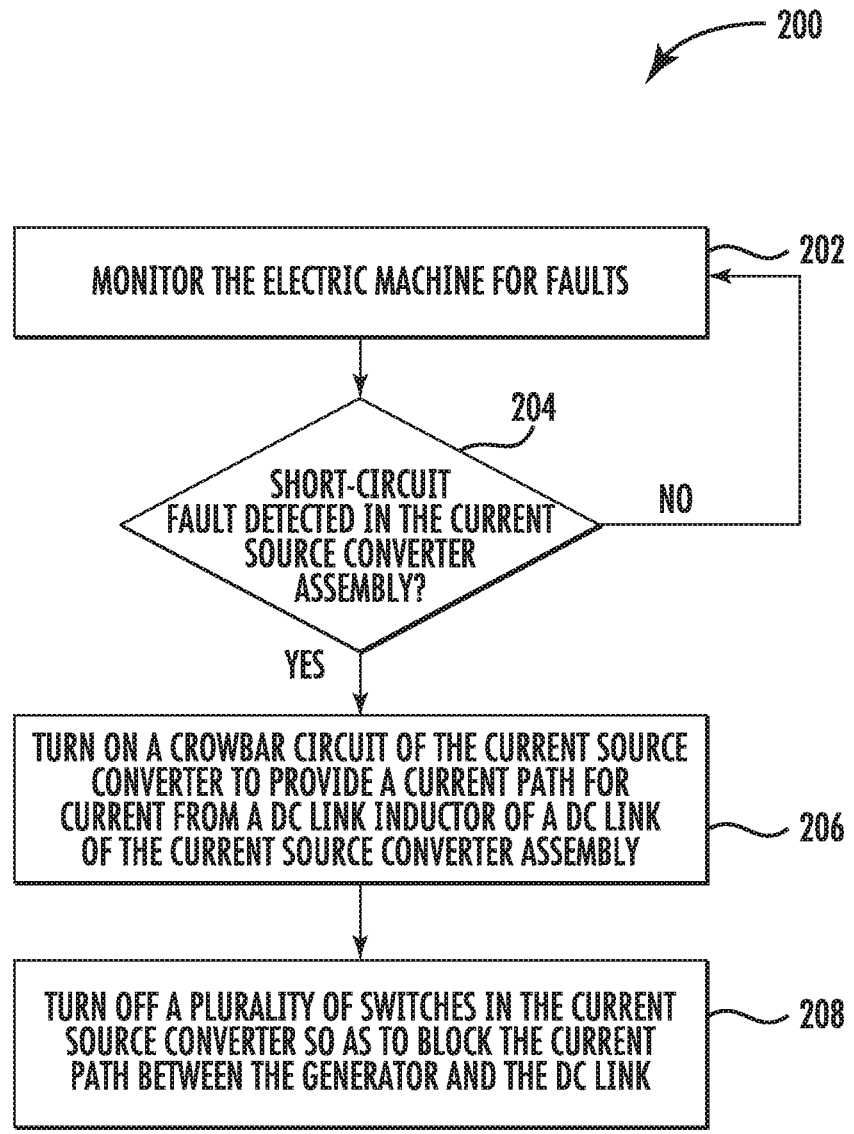
FIG. 12 illustrates a flow diagram of one embodiment of a method of operating a wind turbine according to the present disclosure.

Referring now to FIG. 12, a flow diagram of one embodiment of a method 200 of operating a system, such as the wind turbine power system described herein which includes the superconducting generator 24, according to the present disclosure is illustrated. In general, the method 200 described herein generally applies to operating the wind turbine 10 described above. However, it should be appreciated that the disclosed method 200 may be implemented using any other suitable wind turbine and/or superconducting machine, including generators or motors. Further, FIG. 12 depicts steps performed in a particular order for purposes of illustration and discussion. Those of ordinary skill in the art, using the disclosures provided herein, will understand that various steps of any of the methods disclosed herein can be adapted, omitted, rearranged, or expanded in various ways without deviating from the scope of the present disclosure.

As shown at (202), the method 200 includes monitoring the wind turbine 10 for faults. As shown at (204), the method 200 includes determining whether a short-circuit fault is detected. If so, as shown at (206) and (208), the method 200 continues by turning on a crowbar circuit of the current source converter assembly to provide a current path for current from a DC link inductor of a DC link of the current source converter and turning off a plurality of switches in the current source converter so as to block the current path between the generator and the DC link. If no short-circuit fault is detected, the method 200 continues monitoring for faults.

Figure 13:
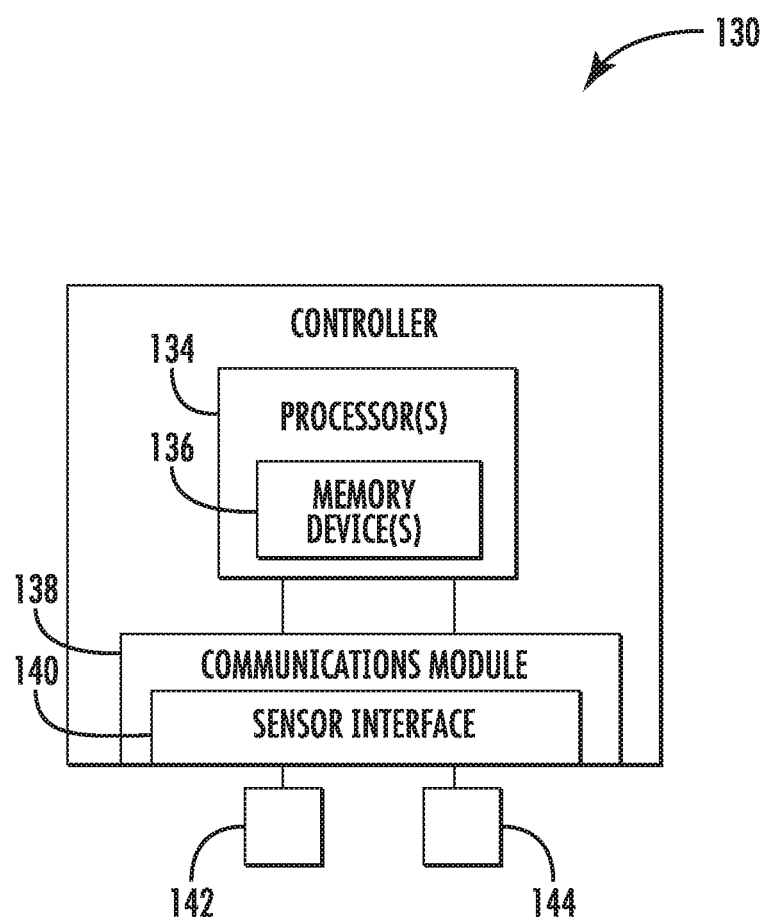
FIG. 13 illustrates a block diagram of one embodiment of a controller that can be used to control the wind turbine and/or system described herein according to the present disclosure.

Referring now to FIG. 13, a block diagram of one embodiment of the controller 130 described herein is illustrated. As shown, the controller 130 may include one or more processor(s) 134 and associated memory device(s) 136 configured to perform a variety of computer-implemented functions (e.g., performing the methods, steps, calculations and the like and storing relevant data as disclosed herein). Additionally, the controller 130 may also include a communications module 138 to facilitate communications between the controller 130 and the various components of the system 100. Further, the communications module 138 may include a sensor interface 140 (e.g., one or more analog-to-digital converters) to permit signals transmitted from one or more sensors 142, 144 located anywhere through the system 100 to be converted into signals that can be understood and processed by the processors 134.

It should be appreciated that the sensors 142, 144 may be communicatively coupled to the communications module 138 using any suitable means. For example, as shown in FIG. 13, the sensors 142, 144 may be coupled to the sensor interface 140 via a wired connection. However, in other embodiments, the sensors 142, 144 may be coupled to the sensor interface 140 via a wireless connection, such as by using any suitable wireless communications protocol known in the art. As such, the processor 134 may be configured to receive one or more signals from the sensors 142, 144. Accordingly, such sensors 142, 144 may be located throughout the system 100, e.g. for monitoring faults as described herein.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 138 is also configured to compute advanced control algorithms and communicate to a variety of Ethernet or serial-based protocols (Modbus, OPC, CAN, etc.). Additionally, the memory device(s) 140 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 140 may generally be configured to store suitable computer-readable instructions that, when implemented by the processor(s) 138, configure the controller 136 to perform the various functions as described herein.

Various aspects and embodiments of the present invention are defined by the following numbered clauses:

Clause 1. A wind turbine, comprising:
a tower;
a nacelle mounted atop the tower;
a rotor coupled to the nacelle, the rotor comprising a rotatable hub and at least one rotor blade secured thereto;
a low-impedance generator coupled to the rotor, the generator comprising at least one armature winding set, the at least one armature winding set comprising a plurality of single-phase coils; and
a current source converter assembly electrically coupled to an armature of the generator, the current source converter assembly comprising at least one current source converter comprising a current source rectifier coupled to a current source inverter via a DC link and at least one capacitor across the plurality of single-phase armature coils,
the at least one capacitor of the current source converter assembly configured to absorb high frequency components of current pulses generated by the current source converter so as to minimize current ripple in a current applied to the plurality of single-phase coils.

Clause 2. The wind turbine of Clause 1, wherein the low-impedance generator is a superconducting generator.

Clause 3. The wind turbine of Clauses 1-2, wherein the at least one capacitor further comprises a plurality of capacitors with at least one of the plurality of capacitors across each of the plurality of single-phase coils.

Clause 4. The wind turbine of any of the preceding clauses, wherein the DC link comprises at least DC link inductor, and wherein current within the DC link is controlled by voltage across the at least DC link inductor.

Clause 5. The wind turbine of Clause 4, wherein the DC link inductor is a stiff current source, the stiff current source comprising an internal impedance of 100 times more than a load impedance.

Clause 6. The wind turbine of any of the preceding clauses, wherein the current source rectifier and the current source inverter each comprise a plurality of switches.

Clause 7. The wind turbine of Clause 6, wherein the current source converter assembly further comprises a crowbar circuit.

Clause 8. The wind turbine of Clause 7, further comprising a controller for controlling operation of the low-impedance generator and the current source converter assembly.

Clause 9. The wind turbine of Clause 8, wherein, upon a short-circuit event in the current source converter assembly, the controller is configured to turn on the crowbar circuit to provide a path for current from the DC link and to turn off the plurality of switches in the current source converter assembly, thereby blocking the current between the generator and the DC link.

Clause 10. The wind turbine of any of the preceding clauses, wherein the current source converter assembly further comprises a plurality of current source converters electrically coupled to the low-impedance generator and to a power grid.

Clause 11. The wind turbine of Clause 10, wherein the plurality of current source converters are connected in parallel.

Clause 12. The wind turbine of Clause 11, wherein each of the plurality of current source converters is configured to process a portion of a total power of the wind turbine.

Clause 13. The wind turbine of Clause 12, further comprising an active power balancing mechanism configured to ensure that the total power is evenly shared among the current source converters.

Clause 14. The wind turbine of any of the preceding clauses, wherein the wind turbine is an offshore wind turbine.

Clause 15. The wind turbine of any of the preceding clauses, wherein the wind turbine is an onshore wind turbine.

Clause 16. A method of operating a wind turbine, the wind turbine having a low-impedance generator with a plurality of single-phase armature coils and a current source converter assembly electrically coupled to the generator, the current source converter assembly having at least one current source converter, the method comprising:
monitoring the wind turbine for faults; and
in response to detecting a short-circuit fault in the current source converter assembly,
turning on, via a controller, a crowbar circuit of the current source converter assembly to provide a current path for current from a DC link inductor of a DC link of the current source converter assembly, and
turning off, via the controller, a plurality of switches in the current source converter assembly so as to block the current path between the generator and the DC link inductor.

Clause 17. The method of Clause 16, wherein the DC link inductor of the current source converter assembly is sized for a stiff current that limits a rise in the fault current during transient or fault conditions, the DC link inductor comprising an internal impedance of 100 times more than the load impedance.

Clause 18. The method of Clauses 16-17, wherein the low-impedance generator is a superconducting generator.

Clause 19. The method of Clauses 16-18, further comprising controlling the fault current within the DC link by controlling voltage across the at least DC link inductor.

Clause 20. The method of Clauses 16-19, wherein the at least one current source converter assembly further comprises a plurality of current source converters electrically coupled to the generator and to a power grid.

Clause 21. The method of Clause 20, further comprising connecting the plurality of current source converters in parallel.

Clause 22. An energy conversion system, comprising:
a low-impedance electric machine; and
a current source converter assembly electrically coupled to the electric machine, the current source converter assembly comprising at least one current source converter comprising a current source rectifier coupled to a current source inverter via a DC link and at least one capacitor,
the at least one capacitor of the current source converter assembly configured to absorb high frequency components of current pulses generated by the current source converter so as to minimize current ripple in a current applied to the electric machine.

Clause 23. The system of Clause 22, wherein the low-impedance electric machine comprises at least one of a generator or a motor.

Clause 24. The system of Clause 23, wherein the generator comprises a superconducting generator comprising a superconducting field winding and a plurality of single-phase armature coils.

Clause 25. The system of Clause 24, wherein the at least one capacitor further comprises a plurality of capacitors with at least one of the plurality of capacitors across each of the plurality of single-phase armature coils.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wind turbine, comprising:
a tower;
a nacelle mounted atop the tower;
a rotor coupled to the nacelle, the rotor comprising a rotatable hub and at least one rotor blade secured thereto;
a superconducting generator coupled to the rotor, the superconducting generator comprising at least one armature winding set having an impedance value lower than an impedance value of an armature winding of a non-superconducting electric machine, the at least one armature winding set comprising a plurality of single-phase coils;
a current source converter assembly electrically coupled to the at least one armature winding set of the superconducting generator, the current source converter assembly comprising a plurality of modular current source converters deployed in a coordinated manner with interleaving switching patterns, each of the plurality of modular current source converters comprising a current source rectifier coupled in series to a current source inverter via a respective DC link and a respective capacitor coupled across the plurality of single-phase coils, each of the plurality of modular current source converters processing a portion of a total active power of the wind turbine; and
an active power balancing mechanism to ensure that the total power is evenly shared among the plurality of modular current source converters,
wherein the respective capacitors of the current source converter assembly absorb high frequency components of current pulses generated by the plurality of modular current source converters so as to minimize current ripple in a current applied to the plurality of single-phase coils of the at least one armature winding set of the superconducting generator.

2. The wind turbine of claim 1, wherein the respective capacitors of each of the plurality of modular current source converters further comprises a plurality of capacitors with at least one of the plurality of capacitors across each of the plurality of single-phase coils.

3. The wind turbine of claim 1, wherein each of the DC links of each of the plurality of modular converter source converters comprises at least DC link inductor, and wherein current within each of the DC links is controlled by voltage across the DC link inductor.

4. The wind turbine of claim 3, wherein each of the DC link inductors is a stiff current source, the stiff current source comprising an internal impedance of 100 times more than a load impedance.

5. The wind turbine of claim 1, wherein the current source rectifier and the current source inverter of each of the plurality of modular current source converters each comprise a plurality of switches.

6. The wind turbine of claim 5, wherein the current source converter assembly further comprises a crowbar circuit.

7. The wind turbine of claim 6, further comprising a controller for controlling operation of the superconducting generator and the current source converter assembly.

8. The wind turbine of claim 7, wherein, upon a short-circuit event in the current source converter assembly, the controller is configured to turn on the crowbar circuit to provide a path for current from each of the DC links and to turn off the plurality of switches in the current source converter assembly, thereby blocking the current between the generator and the DC link.

9. The wind turbine of claim 1, wherein the wind turbine is an offshore wind turbine.

10. The wind turbine of claim 1, wherein the wind turbine is an onshore wind turbine.

11. A method of operating a wind turbine, the method comprising:
providing the wind turbine with a superconducting generator with a plurality of single-phase armature coils having an impedance value lower than an impedance value of armature coils of a non-superconducting electric machine, the superconducting generator further comprising a current source converter assembly electrically coupled thereto, the current source converter assembly having a plurality of modular current source converters deployed in a coordinated manner with interleaving switching patterns, each of the plurality of modular current source converters having a current source rectifier coupled in series to a current source inverter via a respective DC link and a respective capacitor coupled across the plurality of single-phase armature coils, each of the plurality of modular current source converters processing a portion of a total active power of the wind turbine, the wind turbine also having an active power balancing mechanism to ensure that the total power is evenly shared among the plurality of modular current source converters;

monitoring the wind turbine for faults; and in response to detecting a short-circuit fault in the current source converter assembly, turning on, via a controller, a crowbar circuit of the current source converter assembly to provide a current path for current from a DC link inductor of each of the respective DC links of the current source converter assembly, and turning off, via the controller, a plurality of switches in the current source converter assembly so as to block the current path between the superconducting generator and the DC link inductors.

12. The method of claim 11, wherein the DC link inductors of the current source converter assembly are sized for a stiff current that limits a rise in the fault current during transient or fault conditions, each of the DC link inductors comprising an internal impedance of 100 times more than the load impedance.

13. The method of claim 11, further comprising controlling the fault current within each of the DC links by controlling voltage across the DC link inductors.

14. An energy conversion system, comprising:

a low-impedance electric machine;

a current source converter assembly electrically coupled to the electric machine, the current source converter assembly comprising a plurality of modular current source converters deployed in a coordinated manner with interleaving switching patterns, each of the plurality of modular current source converters comprising a current source rectifier coupled in series to a current source inverter via a respective DC link and a respective capacitor, each of the plurality of modular current source converters processing a portion of a total active power of the energy conversion system; and an active power balancing mechanism to ensure that the total power is evenly shared among the plurality of modular current source converters, wherein the respective capacitors of the current source converter assembly absorb high frequency components of current pulses generated by the current source converter so as to minimize current ripple in a current applied to the electric machine.

15. The system of claim 14, wherein the low-impedance electric machine comprises at least one of a generator or a motor.

16. The system of claim 15, wherein the generator comprises a superconducting generator comprising a superconducting field winding and a plurality of single-phase armature coils.

17. The system of claim 16, wherein the at least one capacitor further comprises a plurality of capacitors with at least one of the plurality of capacitors across each of the plurality of single-phase armature coils.

* * * * *